United States Patent [19]
Yang et al.

[11] Patent Number: 5,606,665
[45] Date of Patent: Feb. 25, 1997

[54] BUFFER DESCRIPTOR PREFETCH IN NETWORK AND I/O DESIGN

[75] Inventors: Henry S. Yang, Andover; Shirish S. Sathaye, North Chelmsford, both of Mass.; Michael Ben-Nun; Moshe De-Leon, both of Jerusalem, Israel; Simoni Ben-Michael, Givaat Zeev, Israel

[73] Assignee: Digital Equipment Corporation, Maynard, Mass.

[21] Appl. No.: 269,595

[22] Filed: Jul. 1, 1994

[51] Int. Cl.$^6$ .......................... G06F 15/173; H04L 12/00
[52] U.S. Cl. .......................... 395/200.2; 395/250
[58] Field of Search .......................... 395/200.08, 200.2, 395/309, 310, 872, 876, 250

[56] References Cited

U.S. PATENT DOCUMENTS

| | | | |
|---|---|---|---|
| 5,293,487 | 3/1994 | Russo et al. | 395/200.2 |
| 5,299,313 | 3/1994 | Petersen et al. | 395/200.2 |
| 5,390,299 | 2/1995 | Rege et al. | 395/250 |
| 5,483,640 | 1/1996 | Isfeld et al. | 395/200.03 |
| 5,488,724 | 1/1996 | Firoozmand | 395/200.07 |

*Primary Examiner*—Glenn A. Auve
*Attorney, Agent, or Firm*—Christine M. Kuta; Ronald C. Hudgens

[57] ABSTRACT

The invention improves the efficiency of buffer descriptor processing by performing descriptor prefetches, where multiple descriptors are read within the same descriptor bus transaction. The invention reads multiple buffer descriptors each time the bus is accessed. This allows for a smaller FIFO in a cut-through network adapter because it reduces the number of bus transactions needed to transfer data.

6 Claims, 3 Drawing Sheets

BUFFER DESCRIPTOR PREFETCH IN NETWORK AND I/O DESIGN

FIELD OF THE INVENTION

The present invention relates generally to communications networks, and more particularly, to efficient, flexible network adapters.

BACKGROUND OF THE INVENTION

In a communications network, a network adapter manages the transmission and reception of data packets by transferring data between the network and a shared memory in a computer system. The shared memory is used by several different devices including the system CPU, I/O devices and disks as well as the network. The network adapter accesses the shared memory by a shared system bus.

The shared memory has buffers in which data packets are stored. The buffers are accessed through buffer descriptors. Buffer descriptors define specific information about the buffers and the data packets stored in the buffers, e.g. location, data type, length, and size. The buffer descriptors are located in the shared memory along with the data packets. To transmit or receive a data packet, the network adapter must open a buffer descriptor, transfer the data packet to or from a buffer and then close the buffer descriptor. A buffer descriptor is opened by moving it out of the system memory to a memory in the network adapter. A buffer descriptor is closed by moving it back into the shared memory from the memory in the network adapter. Each descriptor and data transfer operation consists of a system bus request-grant phase and a data bus cycle in which a buffer descriptor or a data packet is transferred. The time elapsed during the request-grant phase is called latency. Even on a high speed system, latency can be high, typically several microseconds, while the data bus cycle is fast, typically a number of nanoseconds. The speed of transmitting or receiving data packets is limited by latency. The latency in opening and closing buffer descriptors is a large component in the delays in packet reception and transmission.

In a cut-through network adapter, a data packet is copied through the adapter into the shared memory. In order to accomplish the data transfer, the adapter buffers the data packet in a first-in, first-out queue (FIFO) on a network controller chip in the adapter. A typical FIFO may, for example, be 128–1024 bytes while data packets may be as large as 4500 bytes. Therefore, typically only small data packets may reside in entirety in the FIFO. Larger data packets need to be transferred through. Controlling access to the system bus in order to access buffer descriptors is key to data transfer. In order to transfer data, the adapter needs to know where to put the data in the system memory, that is, the adapter needs to access buffer descriptors in order to know if a particular location is available.

FIFO size is dependent on system bus latency. The larger the delay from request to grant, the larger the FIFO needs to be in order to transfer data through the network adapter without losing data packets. A larger FIFO would increase the efficiency of data transfer but it would also require a larger, more expensive network controller chip which would need more power.

It remains desirable to transfer large data packets through a network adapter more efficiently, without increasing the size of the network controller chip.

SUMMARY OF THE INVENTION

The problems of transferring data efficiently while keeping network controller chips small and network adapters low in cost are solved by the present invention of a network adapter which performs buffer descriptor prefetch. The invention improves the efficiency of buffer descriptor processing by performing descriptor prefetches, where multiple descriptors are read within the same descriptor bus transaction. The invention reads multiple buffer descriptors each time the bus is accessed. The data packet may then be stored directly to system memory.

BRIEF DESCRIPTION OF THE DRAWINGS

The present invention together with the above and other advantages may best be understood from the following detailed description of the embodiments of the invention illustrated in the drawings, wherein.

DETAILED DESCRIPTION

Figure 1:
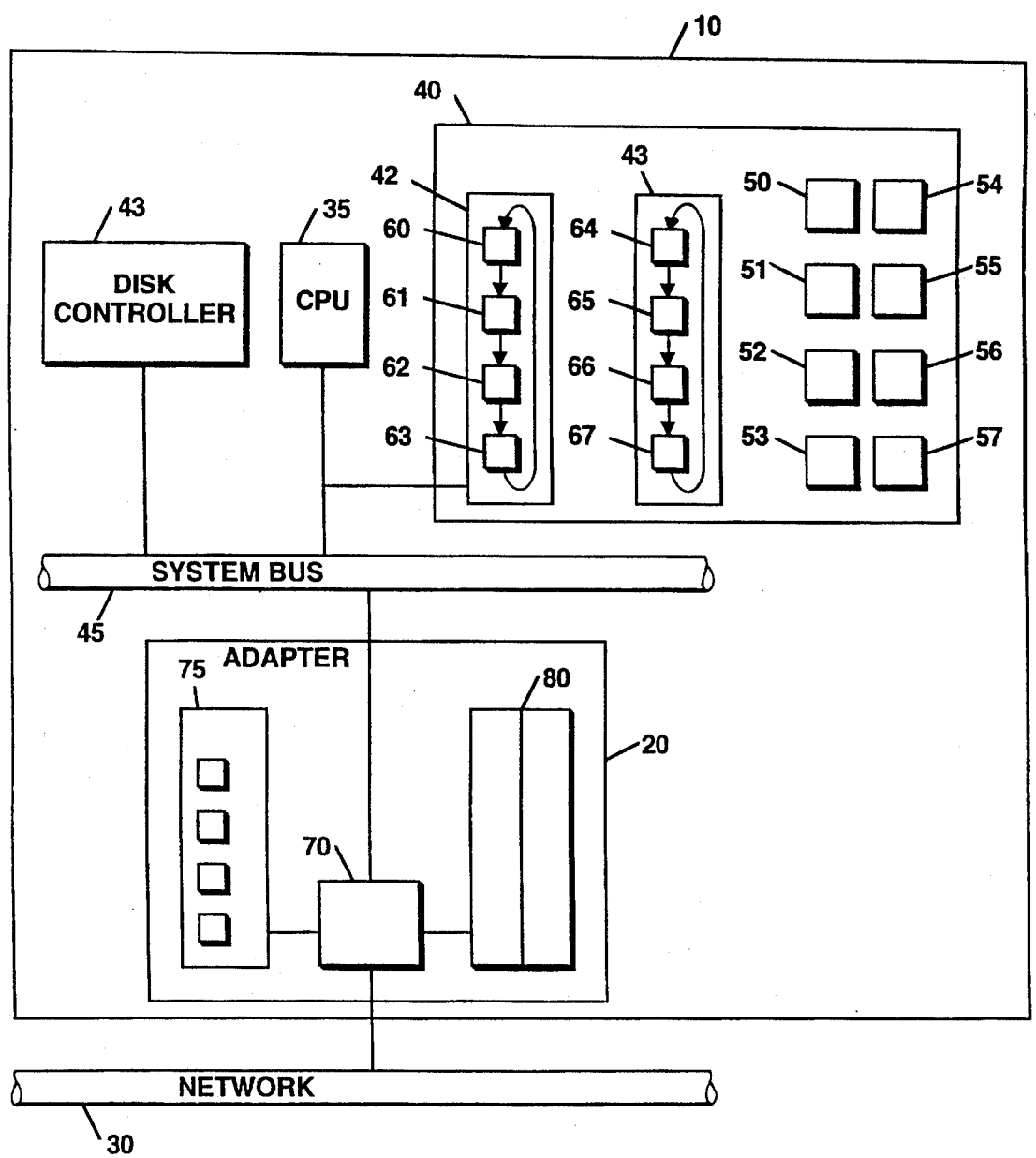
FIG. 1 shows a computer system with a network adapter.

FIG. 1 shows a computer system 10 with a network adapter 20 attached to a network 30. The computer system 10 has a CPU 35, a computer memory 40 and a disk controller 43 attached to the network adapter 20 through a system bus 45. The computer memory 40 has a receive buffer descriptor ring 42, a transmit buffer descriptor ring 43, and buffers 50, 51, 52, 53, 54, 55, 56, 57. The receive buffer descriptor ring 42 has buffer descriptors 60, 61, 62, 63 and the transmit buffer descriptor ring 43 has buffer descriptors 64, 65, 66, 67. The buffer descriptors in the receive buffer descriptor ring 42 and the transmit buffer descriptor ring 43 are physically contiguous except for the last buffer descriptor in each ring. The last buffer in each ring points to the first buffer in the ring. So, in the receive buffer ring 42, buffer descriptor 63 points to buffer descriptor 60 and in the transmit buffer descriptor ring 43, buffer descriptor 67 points to buffer descriptor 64. The network adapter 20 has a controller 70, an adapter memory 75 and a first-in, first-out queue (FIFO) 80. The controller 70 acts as an interface between the network 30 and the network adapter 20 and also as an interface between the system bus 45 and the network adapter 20.

The network adapter 20 manages the transmission and reception of data packets in the computer system 10 by transferring data packets between the network 30 and the computer memory 40, where the data packets are stored. The data packets are stored in the buffers 50, 51, 52, 53, 54, 55, 56, 57 in the computer memory 40. In the exemplary embodiment, there are only eight buffers however, there may be as many as several hundred buffers in a typical computer memory. Each buffer 50, 51, 52, 53, 54, 55, 56, 57 in the computer memory 40 has an associated buffer descriptor 60, 61, 62, 63, 64, 65, 66, 67. Each buffer descriptor 60, 61, 62, 63, 64, 65, 66, 67 stores the location of the associated buffer 50, 51, 52, 53, 54, 55, 56, 57 and has an indicator which shows whether or not the associated buffer 50, 51, 52, 53, 54, 55, 56, 57 is available to the network adapter for data storage or for data transmission. Each buffer descriptor 60, 61, 62, 63, 64, 65, 66, 67 also contains information about the data stored in the associated data buffer 50, 51, 52, 53, 54, 55, 56, 57 such as data type and length, and location of the buffer.

In order to copy a received data packet to the shared memory 40 or to transmit a data packet from the shared memory 40, the network adapter 20 must first open buffer descriptors in the adapter memory 75. To open buffer descriptors, the network adapter 20 must get access to the system bus 45. The network adapter 20 must wait according to the computer system priority rules to use the system bus 45 as the system bus 45 is a resource for which the network adapter 20 competes with the CPU 35 and the disk controller 43. When the network adapter 20 gets control of the system bus 45, it accesses a multiple number of buffer descriptors. For example, for data reception, the network controller chip 70 would read the buffer descriptors 60, 61, 62, 63 to the adapter memory 75 in a single bus transaction.

When a data packet from the network 30 arrives at the network adapter 20, the network adapter 20 accesses the computer memory 40 and opens buffer descriptors from the receive buffer descriptor ring 42. In the exemplary case, buffer descriptors 60, 61, 62, 63 are opened. Each of the buffer descriptors 60, 61, 62, 63 is examined to see if the associated buffer 50, 51, 52, 53 is available. If a buffer is available for data, a packet of data is transferred in and the buffer descriptor is updated with a new status and then the buffer descriptor is closed by transferring the updated buffer descriptor to the computer memory. By accessing multiple buffer descriptors in a single bus transaction, bus latency is amortized over the transfer of a number of data packets.

To transmit data, the CPU 35 fills buffers associated with buffer descriptors in the buffer descriptor transmit ring 43 in the computer memory 40. For example, for a four-buffer data packet, the CPU 35 fills the buffers 54, 55, 56, 57, updates the buffer descriptors 64, 65, 66, 67 with the new status of the buffers 54, 55, 56, 57, and signals the network adapter 20 that there is data to be transmitted. When the network adapter 20 receives the signal from the CPU 35, the network adapter 20 opens, in a single bus transaction, a plurality of buffer descriptors from the data transmit ring 43, in the exemplary case, buffer descriptors 64, 65, 66, 67. Each buffer descriptor 64, 65, 66, 67 is examined to see if it contains data. If a buffer has a data packet to be transmitted, the packet is transferred out onto the network, the associated buffer descriptor is updated with a new status and then the buffer descriptor is closed.

In an alternative embodiment of the invention, the network adapter 20 polls the buffer descriptors in the buffer descriptor transmit ring 43 for their status and transmits data from the buffers without prompting from the CPU 35. In polling, the network adapter 20 periodically examines the transmit buffer descriptor ring 43 for data to be transmitted. As above, the network adapter 20 opens a multiple number of buffer descriptors in the same bus transaction, examines them for data to be transmitted, transmits the data, updates the buffer descriptors, closes the buffer descriptors and then opens a multiple number of buffer descriptors that come next in the buffer descriptor transmit ring 43.

Figure 2:
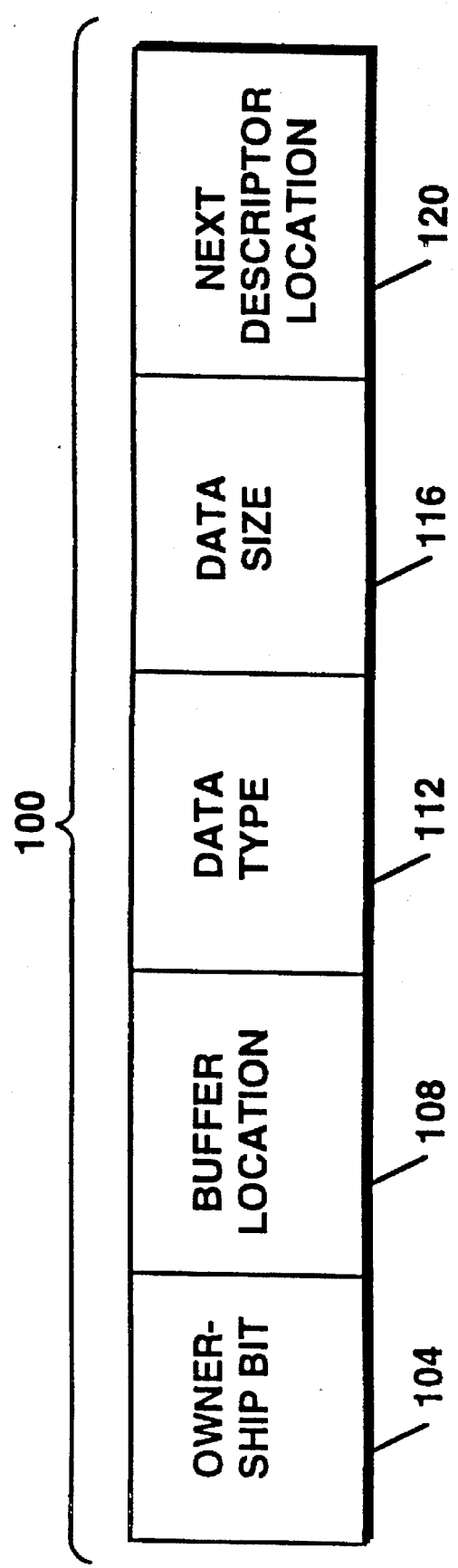
FIG. 2 shows an exemplary buffer descriptor.

FIG. 2 shows an exemplary buffer descriptor 100. The buffer descriptor 100 has five fields, an ownership bit field 104, a buffer location field 108, a data type field 112, a data size field 116 and a next descriptor field 120. The ownership bit field 104 indicates whether the buffer associated with the buffer descriptor is available to the network adapter 20 for data transmission or reception, or whether the buffer is owned by the CPU 35. In the exemplary embodiment, the ownership bit field 104 is set to yes if the buffer is available to the network adapter 20 and to no if it is not. The buffer location field 108 holds a pointer to the buffer associated with the buffer descriptor 100. The data type field 112 and the data size field 116, hold information about the data stored in the buffer. Buffer descriptors are kept in the shared memory 40 in the form of a linked list. The next descriptor field 120 holds a pointer to the next descriptor in the ring.

Figure 3:
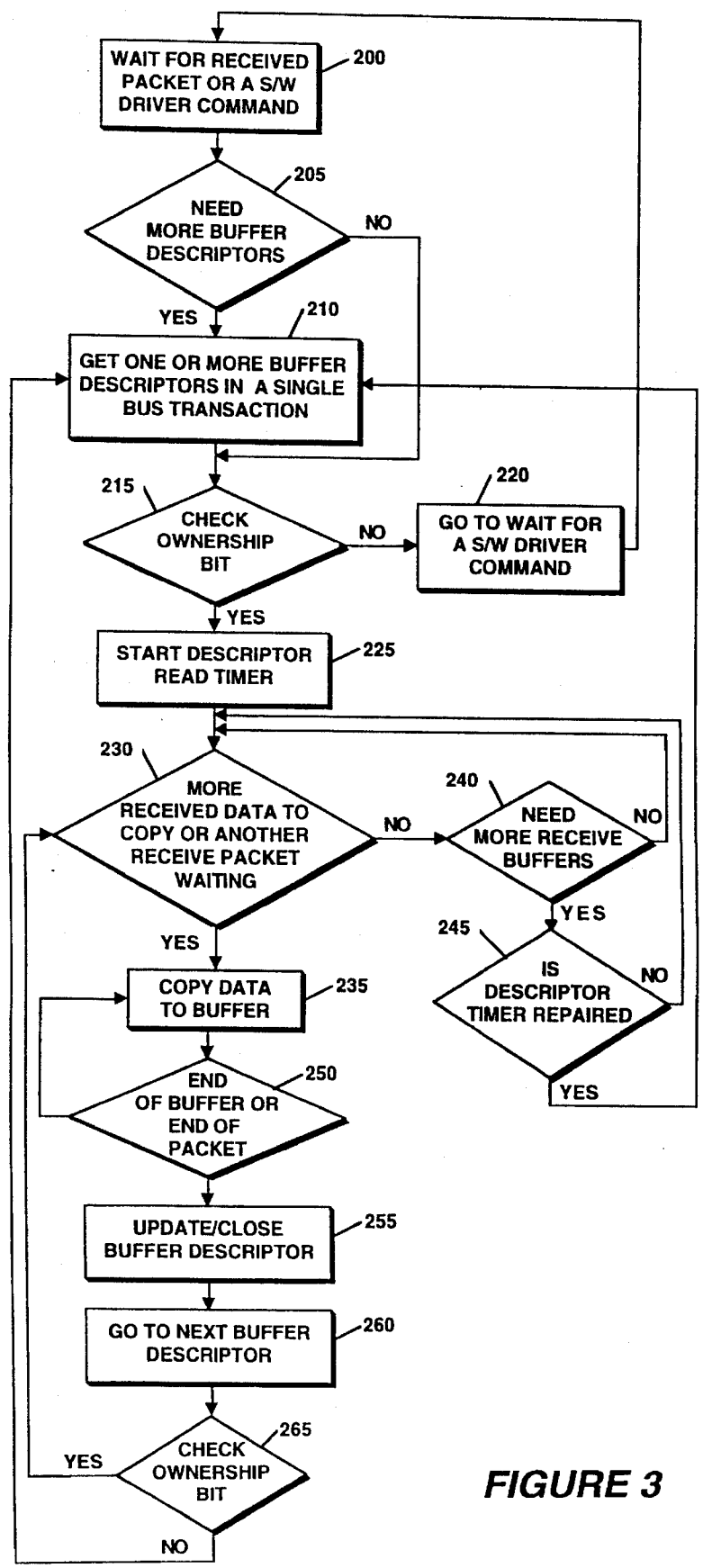
FIG. 3 is a flow chart of the data packet receive process.

Data is received and processed in the present invention as shown in the flow chart in FIG. 3. The network controller 70 opens a multiple number of receive buffer descriptors under certain conditions. The controller 70 waits until it receives a data reception command from a software driver in the CPU 35 or the controller 70 waits for a data packet to be received, block 200. The controller 70 then checks if it already has open buffer descriptors and decides if more are needed, block 205. If more buffer descriptors are needed, the controller 70 fetches one or more buffer descriptors in a single bus transaction, block 210.

The controller 70 begins checking the buffer descriptors for availability of their associated buffers. The controller 70 checks the ownership bit of the buffer descriptors one by one, block 215. If none of the fetched buffer descriptors are available then the controller goes back to the mode of waiting for a software driver command to fetch more buffer descriptors, block 220.

In a first embodiment of the present invention, when the controller 70 finds an available buffer descriptor, the controller 70 looks for data to copy into the buffer associated with the available buffer descriptor, block 230. In a second embodiment of the invention, the controller starts a descriptor read timer, block 225, before looking for data to copy. The descriptor read timer is used to limit the rate of buffer descriptor prefetch when there is no more data from a received packet waiting to be copied. An exemplary timer value is one millisecond.

If the controller 70 finds data to be copied, block 230, it copies data from the packet to the available buffer, block 235. In the first embodiment of the invention, if the controller 70 finds no data, it waits for a data packet to arrive. In the second embodiment of the invention, the controller checks to see if more buffer descriptors are needed, block 240. If no buffer descriptors are needed, the controller waits, as in the first embodiment for data packets to be received, block 230. If more buffer descriptors are needed, the controller 70 checks to see if the descriptor read timer has expired, block 245. If the timer has not expired, the controller does not fetch additional buffer descriptors and waits for data to be received, block 230. If the timer has expired, the controller fetches one or more buffer descriptors in a single bus transaction, block 210.

If there is data to be copied at block 230, the controller continues to copy data to the available buffer until it reaches the end of the buffer or the end of the packet, block 250. When the end of the buffer or the end of the packet is reached, the buffer descriptor is updated with the new status and the buffer descriptor is closed, block 255. The controller 70 then goes to the next buffer descriptor, block 260, and checks the ownership bit of that buffer descriptor to see if the associated buffer is available, block 265. If the buffer is available, then the controller 70 goes to look for data to copy into the associated buffer, block 230. If the buffer is not available, the controller fetches one or more buffer descriptor in a single bus transaction, block 210.

It is to be understood that the above-described embodiments are simply illustrative of the principles of the invention. Various and other modifications and changes may be made by those skilled in the art which will embody the principles of the invention and fall within the spirit and scope thereof.

What is claimed is:

1. A method for receiving one or more data packets, comprising the steps of:

receiving a data packet at a network adapter;

fetching a plurality of buffer descriptors from a shared memory during a bus transaction, said buffer descriptors having associated buffers in said shared memory, said shared memory connected to said network adapter over a shared bus supporting said bus transaction;

holding said plurality of buffer descriptors in an adapter memory in said network adapter;

determining availability of the associated buffer of a one of said plurality of buffer descriptors;

writing at least a first part of said data packet to an associated buffer of said one of said plurality of buffer descriptors in response to a determination of availability; and, continuing to write a further part of said data packet to a buffer associated with a next said buffer descriptor.

2. A method for transmitting a data packet, comprising the steps of:

sending a signal to a network adapter that a data packet is to be transmitted;

fetching a plurality of buffer descriptors from a shared memory during a bus transaction in response to said signal, said buffer descriptors having associated buffers in said shared memory, said buffers for storing said data packet, said shared memory connected to said network adapter over a shared bus;

holding said plurality of buffer descriptors in an adapter memory in said network adapter;

determining whether the associated buffer of a one of said plurality of buffer descriptors contains a part of said data packet to be transmitted;

transmitting the data from the associated buffer of said one of said plurality of buffer descriptors in response to said determining that there was data to transmit; and, continuing to transmit a further part of said data packet by examining a next buffer descriptor of said plurality of buffer descriptors for data to be transmitted.

3. An apparatus for transmitting and receiving data packets, comprising:

a first memory for storing a data packet, said first memory having a plurality of buffers, said first memory having a plurality of buffer descriptors corresponding to said plurality of buffers; and, a network adapter connected to said first memory by a shared bus, said network adapter having a second memory capable of storing a plurality of buffer descriptors, said network adapter capable of fetching a plurality of buffer descriptors from said first memory in a single bus transaction in response to a signal for data transfer.

4. An apparatus as in claim 3, wherein said first memory is a shared memory in a computer.

5. A method for transferring a data packet, comprising:

storing a data packet in a first memory, said first memory having a plurality of buffers, said data packet stored in said plurality of buffers, and said first memory having a plurality of buffer descriptors corresponding to said plurality of buffers;

fetching during a single bus transaction said plurality of buffer descriptors from said first memory by a network adapter, said network adapter connected to said first memory by a shared bus; and, storing said plurality of buffer descriptors in a second memory located in said network adapter.

6. The method of claim 5 further comprising:

transferring data from said plurality of buffers to said network adapter in response to said plurality of buffer descriptors;

transmitting said data onto a network by said network adapter in response to transfer of said data from said buffer to said network adapter.

* * * * *